(12) United States Patent
Lee et al.

(10) Patent No.: US 12,211,393 B2
(45) Date of Patent: Jan. 28, 2025

(54) CODING TEST DEVICE AND CODING TEST METHOD

(71) Applicant: JA-IN Lab. Co., Ltd, Seongnam-si (KR)

(72) Inventors: Hyung Woo Lee, Seongnam-si (KR); Dae Seok Shin, Seoul (KR); Dae Sung Jang, Yongin-si (KR); Seong In Kim, Seongnam-si (KR); Hyung Woo Kim, Seongnam-si (KR); Byoung Ho Lee, Seoul (KR); Hyeon Ho Lee, Gwangju-si (KR)

(73) Assignee: JA-IN Lab. Co., Ltd, Seongnam-si (KR)

( * ) Notice: Subject to any disclaimer, the term of this patent is extended or adjusted under 35 U.S.C. 154(b) by 0 days.

(21) Appl. No.: 18/310,995

(22) Filed: May 2, 2023

(65) Prior Publication Data
US 2023/0368696 A1 Nov. 16, 2023

(30) Foreign Application Priority Data
May 13, 2022 (KR) .................. 10-2022-0058964

(51) Int. Cl.
*G09B 19/00* (2006.01)
*G06F 8/77* (2018.01)
*G06Q 10/1053* (2023.01)
*G09B 7/02* (2006.01)

(52) U.S. Cl.
CPC .......... *G09B 19/0053* (2013.01); *G06F 8/77* (2013.01); *G06Q 10/1053* (2013.01); *G09B 7/02* (2013.01)

(58) Field of Classification Search
CPC ......... G09B 19/0053; G09B 7/02; G06F 8/77; G06Q 10/1053
See application file for complete search history.

(56) References Cited

FOREIGN PATENT DOCUMENTS
KR 10-2221228 B1 3/2021

*Primary Examiner* — Kesha Frisby
(74) *Attorney, Agent, or Firm* — Sughrue Mion, PLLC

(57) ABSTRACT

The present disclosure relates to a coding test device and a coding test method. The coding test device according to one embodiment includes a problem provider for providing a test problem including an initial condition to a user terminal, a code receiver for receiving first algorithm code corresponding to the initial condition from the user terminal, and an additional condition provider for determining whether a predetermined passing condition for the first algorithm code is satisfied and providing an additional condition related to the initial condition to the user terminal based on the result of determination for the first algorithm code.

11 Claims, 6 Drawing Sheets

[FIG 1]
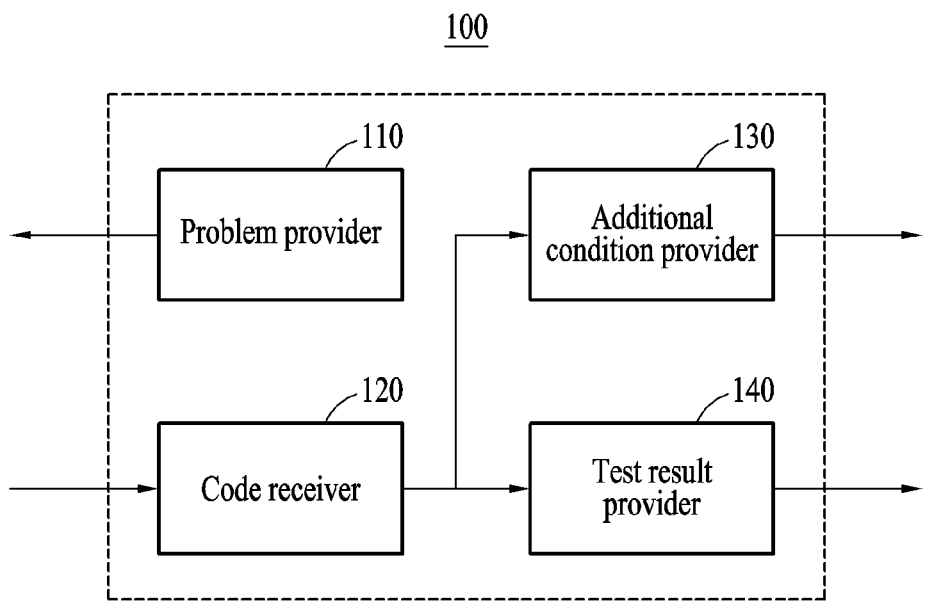
[FIG 2]
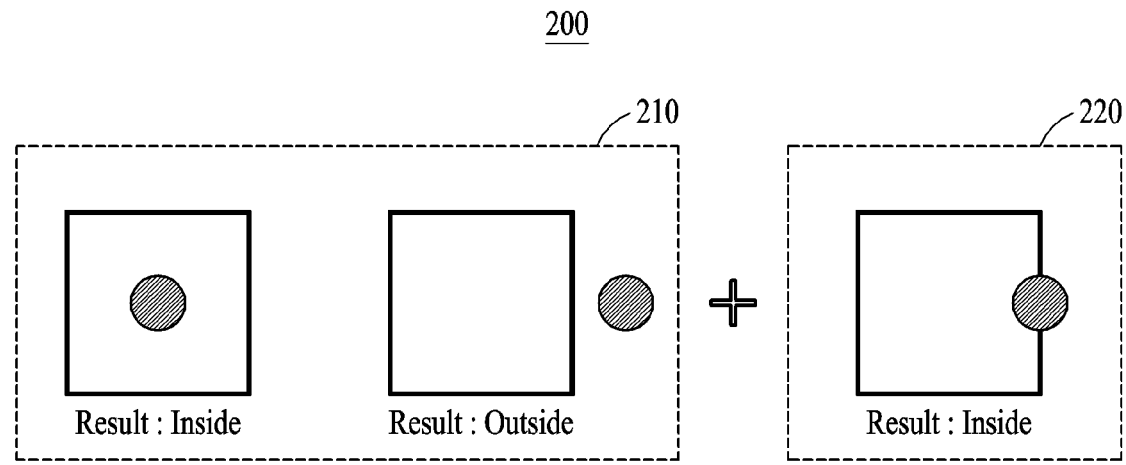

[FIG 3A]
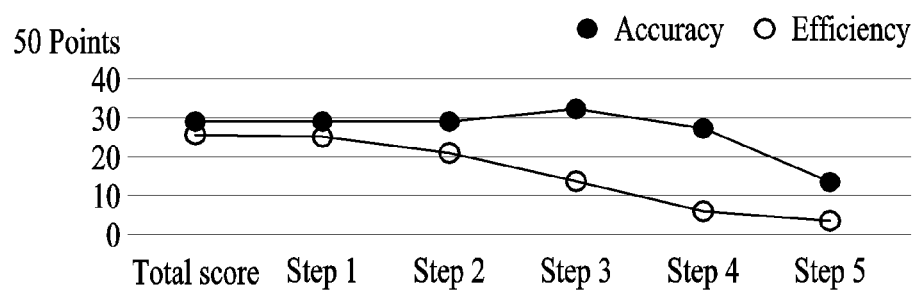
[FIG 3B]
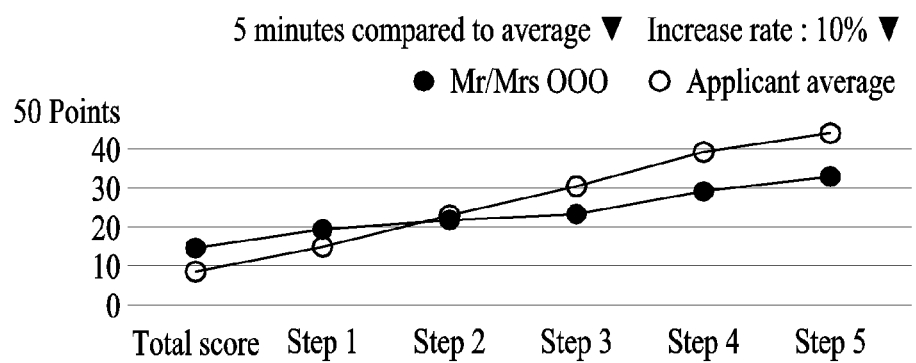

[FIG 3C]
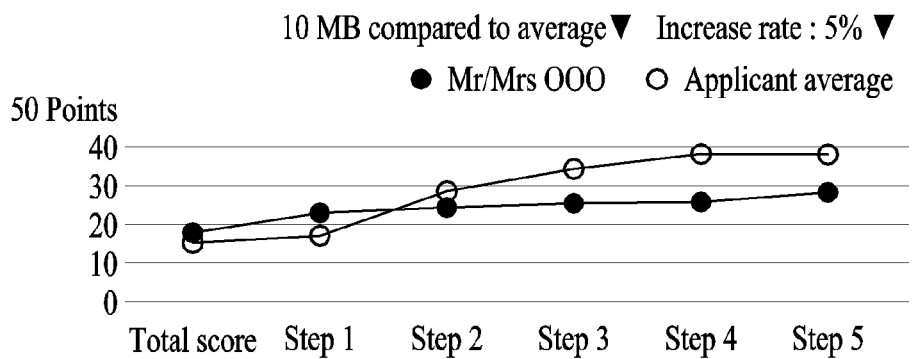
[FIG 3D]
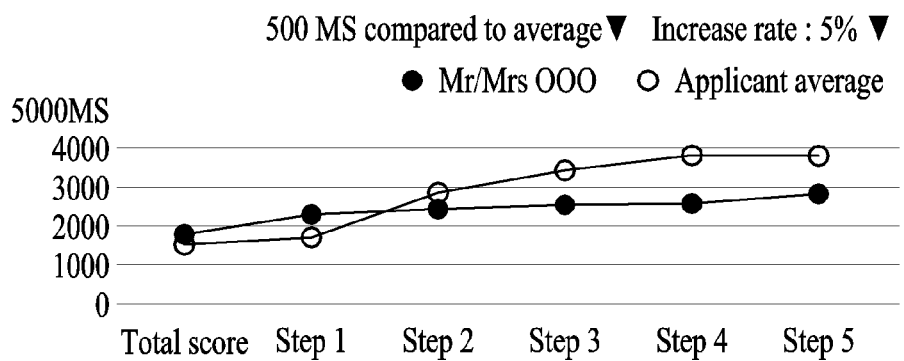

[FIG 4A]
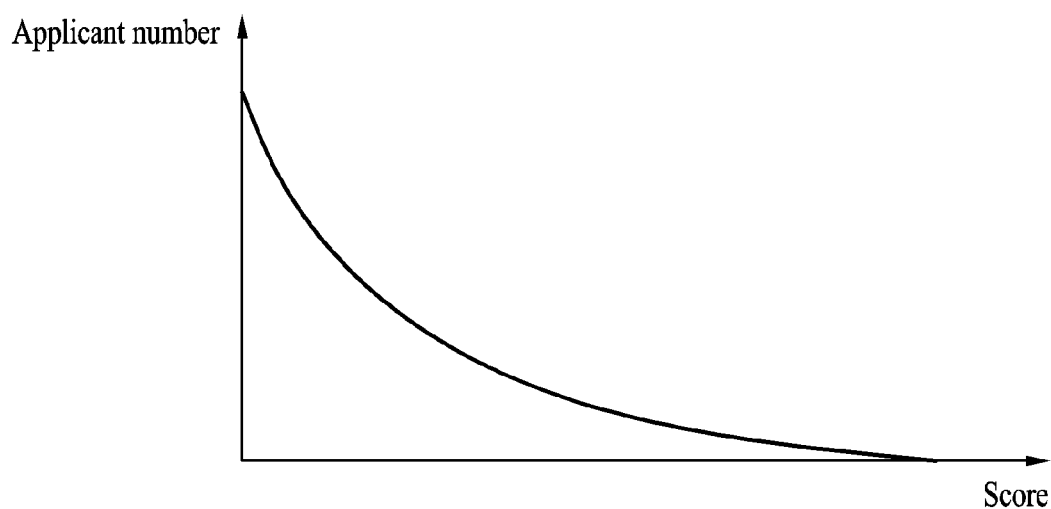
410
[FIG 4B]
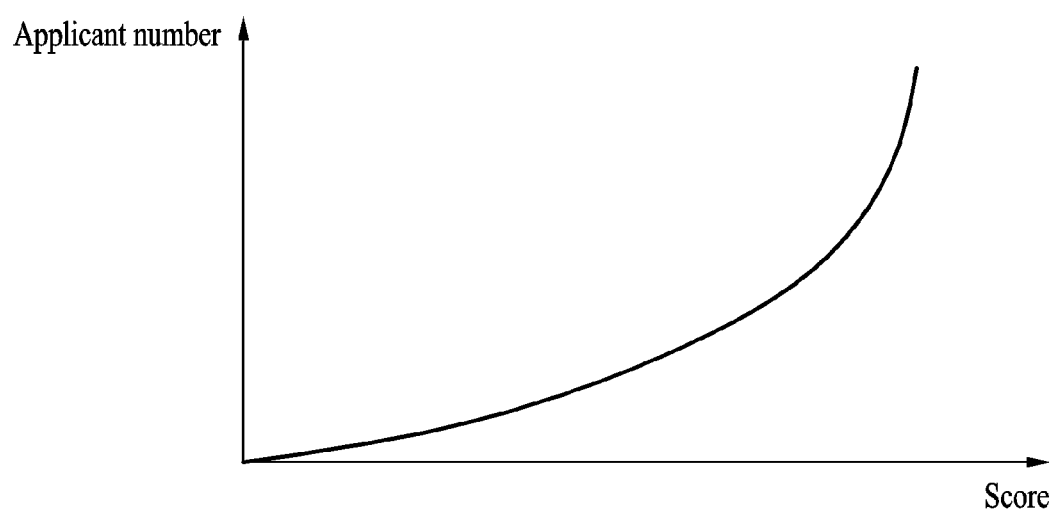
420

[FIG 4C]
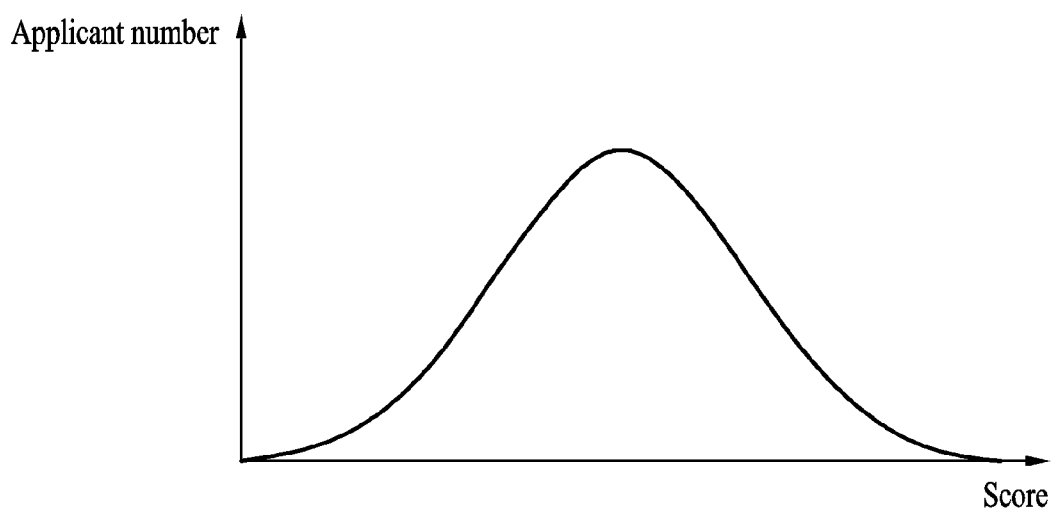

[FIG 5]
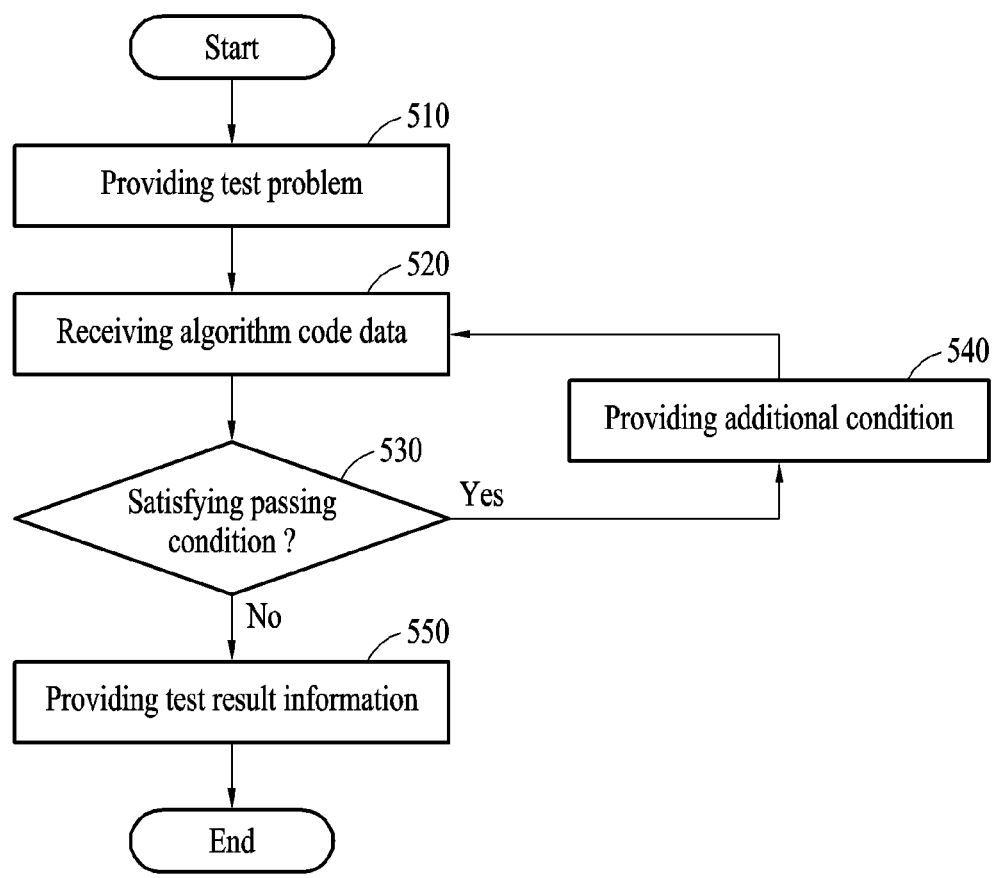

CODING TEST DEVICE AND CODING TEST METHOD

CROSS-REFERENCE TO RELATED APPLICATION

This application claims priority to Korean Patent Application No. 10-2022-0058964, filed on May 13, 2022, in the Korean Intellectual Property Office, the disclosure of which is incorporated herein by reference.

BACKGROUND OF THE DISCLOSURE

Field of the Disclosure

The present disclosure relates to a coding test device and a coding test method, and more particularly, to a technical concept for a coding test with additional conditions.

Description of the Related Art

Online coding tests are evolving from algorithm competitions performed in offline environments, and algorithm competitions aim to rank high in a competitive group while solving algorithm problems within a limited time.

Recently, most developers are using online coding tests for recruitment purposes, and accordingly, developers preparing for recruitment are investing a lot of time in learning algorithms for testing.

Specifically, several years ago, there was a case of hiring excellent developers through algorithm tests and interviews at famous domestic and foreign IT companies. Since then, many companies have been using their own algorithm tests. As the demand for developers increased, commercial services supported by online algorithm testing environments also appeared.

However, as the amount of algorithm learning of job seekers increased, problem-solving ability was leveled up. However, the types of algorithm problems presented in coding tests were limited, so quickly identifying problem patterns became an important factor in the tests.

In fact, just as English proficiency and TOEIC scores are not proportional, there are many opinions in the industrial field that a coding test alone cannot predict an applicant's ability. Thus, most companies are using coding tests for the purpose of quickly filtering out applicants with low ability.

Specifically, the conventional online coding test (hereinafter referred to as CT) is based on a method of writing one algorithm code from one presented problem. In the CT, the applicant's ability is judged based on the expected difficulty of an expected algorithm, and the method of estimating the difficulty varies according to the purpose of the test.

In the case of an algorithm published on a well-known online coding test service, the difficulty is determined based on the ratio of people who tried to solve the problem to those who solved the problem. That is, as the number of people who solved the problem decreases, the difficulty increases.

Other methods of judging the difficulty of a problem are mostly based on technical experience, but these methods are somewhat inconsistent because the methods are affected by the verification environment and experience level of the examiner.

In a recruitment process, it is important to accurately judge the applicant's algorithm solving ability, but in the case of CT, difficulty prediction is very important because pass or fail must be determined based on the number of problems solved.

In the CT, the test difficulty is adjusted by giving a number of questions, but it is difficult to accurately predict the test difficulty because the test difficulty varies depending on the experience and environment of an examiner. Recently, since applicants repeatedly learn the patterns of questions, the percentage of perfect score in the test is very high.

The purpose of the CT is to filter out applicants with low ability. However, when there are too many perfect scorers or too few high scorers due to failure in difficulty adjustment, additional verification is required, which may increase recruitment costs.

Therefore, there is an increasing demand for an efficient and reliable coding test compared to conventional coding tests.

RELATED ART DOCUMENTS

Patent Documents

Korean Patent No. 10-2221228, "METHOD OF PROVIDING CODING TEST AND SCORING ALGORITHM"

SUMMARY OF THE DISCLOSURE

Therefore, the present disclosure has been made in view of the above problems, and it is an object of the present disclosure to provide a coding test device and a coding test method that are capable of verifying user's coding ability with higher accuracy than conventional coding tests through a problem-solving coding test with additional conditions.

It is another object of the present disclosure to provide a coding test device and a coding test method that are capable of increasing the accuracy of verification of user's coding ability by providing a result report reflecting an evaluation cumulative score, an evaluation score for each step, coding time, CPU usage, and memory usage as results of a coding test.

In accordance with one aspect of the present disclosure, provided is a coding test device including a problem provider for providing a test problem including an initial condition to a user terminal; a code receiver for receiving first algorithm code corresponding to the initial condition from the user terminal; and an additional condition provider for determining whether a predetermined passing condition for the first algorithm code is satisfied and providing an additional condition related to the initial condition to the user terminal based on the result of determination for the first algorithm code.

According to one aspect, the additional condition provider may determine whether a passing condition for (n+1)th algorithm code corresponding to an nth additional condition (n is a positive integer) is satisfied, and may provide an (n+1)th additional condition related to the nth additional condition to the user terminal based on the result of determination for the (n+1)th algorithm code.

According to one aspect, the code receiver may receive the (n+1)th algorithm code and (n+2)th algorithm code corresponding to the (n+1)th additional condition from the user terminal.

According to one aspect, when it is determined that the (n+1)th algorithm code violates a preset association rule, the additional condition provider may determine that the passing condition is not satisfied.

According to one aspect, when the (n+1)th algorithm code does not satisfy both a kth additional condition (k is a positive integer that satisfies an equation of k=n−1) and the nth additional condition, the additional condition provider may determine that the association rule is violated.

According to one aspect, when the (n+1)th algorithm code is not data obtained by modifying the nth algorithm code to satisfy the nth additional condition, the additional condition provider may determine that the association rule is violated.

According to one aspect, when an evaluation score for any one code of the first algorithm code and the (n+1)th algorithm code is less than a preset threshold score, or a coding time of the any one code exceeds a preset threshold time, the additional condition provider may determine that the passing condition is not satisfied.

According to one aspect, the coding test device may further include a test result provider for providing test result information about the any one code to a preset administrator terminal when it is determined that any one code of the first algorithm code and the (n+1)th algorithm code does not satisfy the passing condition.

According to one aspect, when it is determined that the (n+1)th algorithm code does not satisfy the passing condition, the test result provider may calculate, as the test result information, a cumulative score based on evaluation scores for each of the first algorithm code to the nth algorithm code.

According to one aspect, when it is determined that the (n+1)th algorithm code does not satisfy the passing condition, the test result provider may calculate the test result information including at least one information of the first algorithm code to the nth algorithm code and evaluation scores, coding time, CPU usage, and memory usage corresponding to each of the first algorithm code to the nth algorithm code.

In accordance with another aspect of the present disclosure, provided is a coding test method including providing, by a problem provider, a test problem including an initial condition to a user terminal; receiving, by a code receiver, first algorithm code corresponding to the initial condition from the user terminal; and determining, by an additional condition provider, whether a predetermined passing condition for the first algorithm code is satisfied and providing an additional condition related to the initial condition to the user terminal based on the result of determination for the first algorithm code.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a block diagram for explaining a coding test device according to one embodiment;

FIG. 2 is a block diagram illustrating an example of a test problem based on an association rule according to one embodiment;

FIGS. 3A to 3D are graphs showing examples of test result information calculated through a coding test device according to one embodiment;

FIGS. 4A to 4C are graphs for explaining a user's score distribution according to a coding test device according to one embodiment; and FIG. 5 is a flowchart for explaining a coding test method according to one embodiment.

DETAILED DESCRIPTION OF THE DISCLOSURE

Hereinafter, various embodiments of the present disclosure will be described in detail with reference to the accompanying drawings.

It should be understood that the present disclosure is not limited to the embodiments according to the concept of the present disclosure, but includes changes, equivalents, or alternatives falling within the spirit and scope of the present disclosure.

In the following description of the present disclosure, detailed description of known functions and configurations incorporated herein will be omitted when it may make the subject matter of the present disclosure unclear.

In addition, the terms used in the specification are defined in consideration of functions used in the present disclosure, and can be changed according to the intent or conventionally used methods of clients, operators, and users. Accordingly, definitions of the terms should be understood on the basis of the entire description of the present specification.

In description of the drawings, like reference numerals may be used for similar elements.

The singular expressions in the present specification may encompass plural expressions unless clearly specified otherwise in context.

In this specification, expressions such as "A or B" and "at least one of A and/or B" may include all possible combinations of the items listed together.

Expressions such as "first" and "second" may be used to qualify the elements irrespective of order or importance, and are used to distinguish one element from another and do not limit the elements.

It will be understood that when an element (e.g., first) is referred to as being "connected to" or "coupled to" another element (e.g., second), the first element may be directly connected to the second element or may be connected to the second element via an intervening element (e.g., third).

As used herein, "configured to" may be used interchangeably with, for example, "suitable for", "ability to", "changed to", "made to", "capable of", or "designed to" in terms of hardware or software.

In some situations, the expression "device configured to" may mean that the device "may do~" with other devices or components.

For example, in the sentence "processor configured to perform A, B, and C", the processor may refer to a general purpose processor (e.g., CPU or application processor) capable of performing corresponding operation by running a dedicated processor (e.g., embedded processor) for performing the corresponding operation, or one or more software programs stored in a memory device.

In addition, the expression "or" means "inclusive or" rather than "exclusive or".

That is, unless mentioned otherwise or clearly inferred from context, the expression "x uses a or b" means any one of natural inclusive permutations.

In the above-described specific embodiments, elements included in the invention are expressed in singular or plural in accordance with the specific embodiments shown.

It should be understood, however, that the singular or plural representations are to be chosen as appropriate to the situation presented for the purpose of description and that the above-described embodiments are not limited to the singular or plural constituent elements. The constituent elements expressed in plural may be composed of a single number, and constituent elements expressed in singular form may be composed of a plurality of elements.

In addition, the present disclosure has been described with reference to exemplary embodiments, but it should be understood that various modifications may be made without departing from the scope of the present disclosure.

Therefore, the scope of the present disclosure should not be limited by the embodiments, but should be determined by the following claims and equivalents to the following claims.

FIG. 1 is a block diagram for explaining a coding test device according to one embodiment.

Referring to FIG. 1, a coding test device 100 according to one embodiment may verify user's coding ability with higher accuracy than conventional coding tests through a problem-solving coding test with additional conditions.

In addition, the coding test device 100 may increase the accuracy of verification of user's coding ability by providing a result report reflecting an evaluation cumulative score, an evaluation score for each step, coding time, CPU usage, and memory usage as results of a coding test.

Specifically, the conventional coding test (CT) is based on writing and submitting a new code to solve problems. On the other hand, a problem-solving test (hereinafter referred to as PST) provided through the coding test device 100 according to one embodiment is based on a method of repeatedly solving additional conditions after solving a problem.

Since this method of PST is similar to a situation of development practices in which functional requirements are repeatedly presented, coding ability may be verified with higher accuracy than conventional CT in diagnosing problem-solving ability in an actual field.

More specifically, the PST requires users (coding test applicants) to write a code to solve a problem, predict an additional condition in the next step, and design a code structure that is easily extensible.

The user verification process of the PST includes 1) an initial problem analysis step, 2) an initial problem solving step, 3) an additional condition analysis step, and 4) an additional condition solving step.

When there is an additional condition, the 'additional condition analysis step' may proceed again. Depending on user's processing ability, the 'additional condition analysis step' and the 'additional condition solving step' may be repeatedly performed as many times as the number of pre-prepared additional conditions.

In the 'initial problem analysis step' of the PST, the core purpose of a problem is shared, and an additional condition may be predicted based on the core purpose.

When a code is written without predicting an additional condition according to the conventional CT method, the cost of modifying a code according to the additional condition increases. This thinking process is the same as designing a code structure while considering maintainability, scalability, and stability in an actual field.

In fact, there are cases in which applicants who have entered a company with excellent CT scores in a recruitment process have lower development productivity in complex actual work processes. Applicants who studied with a focus on solving simple algorithms are more likely to fall under this category.

In the PST, when a passing condition is satisfied and a problem is solved in the 'initial problem solving step', an additional condition is presented. In this case, the additional condition does not require solving a completely different problem than the one in the previous step, and may be configured to solve a problem while satisfying a certain percentage of the previous condition.

The coding test device 100 may be divided into a unit that satisfies an association rule and helps in problem creation and testing and a unit that collects test results and analyzes development ability.

A test problem generated by the coding test device 100 may be composed of several steps of algorithm definition. Here, the basic elements of algorithm definition may include problem description, input, output, input values for verifying accuracy and efficiency, result values, time limit, supportable programming languages, and initially provided codes.

In addition, the basic elements of the additional condition of the PST are the same as the basic elements of an algorithm, however additional input and review steps are required to ensure the continuity and correlation of the condition. Here, the input and review steps required for the additional condition may include 'additional condition keywords and description', 'reviewing the algorithm association rule of input/output', 'input/output association rule review', 'a passing score of a current step', and 'a score percentage of a current step'.

In addition, at each step of the PST, a user may write and submit algorithm codes in the same way as in the conventional CT. The coding test device 100 may provide the user with the next step when the submitted algorithm code obtains a passing score for the current step. Specifically, upon entering the next step, the coding test device 100 may maintain the algorithm code written by the user in the previous step on a screen the user is gazing at, and may provide additional condition keywords and explanations therefor.

At this time, applicants who have entered the next stage get additional time to resolve additional conditions and may not go back to the previous stage.

Hereinafter, the PST according to one embodiment will be described in detail through a problem provider 110, a code receiver 120, an additional condition provider 130, and a test result provider 140 of the coding test device 100.

The problem provider 110 according to one embodiment may provide a test problem including an initial condition to a user terminal.

The code receiver 120 according to one embodiment may receive first algorithm code corresponding to the initial condition from the user terminal.

That is, the first algorithm code may be an algorithm code written by the user to satisfy the initial condition included in the test problem.

The additional condition provider 130 according to one embodiment may determine whether a predetermined passing condition for the first algorithm code is satisfied, and may provide an additional condition related to the initial condition to the user terminal based on the result of determination for the first algorithm code.

According to one aspect, the additional condition provider 130 may determine whether a passing condition for the (n+1)th algorithm code corresponding to the nth additional condition (n is a positive integer) is satisfied, and may provide the (n+1)th additional condition related to the nth additional condition to the user terminal based on the result of determination for the (n+1)th algorithm code.

In addition, the code receiver 120 may receive the (n+1)th algorithm code and the (n+2)th algorithm code corresponding to the (n+1)th additional condition from a user terminal.

That is, whenever a user satisfies a passing condition, the coding test device 100 sequentially presents m pre-prepared additional conditions (m is a positive integer that satisfies the equation of m≥n) to a user in response to a test problem, and may evaluate the user's coding ability for these additional conditions.

That is, whenever a user satisfies a passing condition, the coding test device 100 may sequentially provide an initial condition, a first additional condition, a second additional condition, . . . , an (m−1)th additional condition, and an mth additional condition to a user, and may receive first algorithm code, second algorithm code, . . . , mth algorithm code, and (m+1)th algorithm code corresponding to the provided initial condition and additional conditions to evaluate the user's coding ability.

According to one aspect, when it is determined that the (n+1)th algorithm code violates a preset association rule, the additional condition provider 130 may determine that a passing condition is not satisfied.

Specifically, the association rule may include an input/output association rule and an algorithm association rule.

Hereinafter, the time of providing an (n−1)th additional condition is defined as the previous step (i.e., receiving and evaluating nth algorithm code), and the time of providing an nth additional condition is defined as the current step (i.e., receiving and evaluating (n+1)th algorithm code).

When (n+1)th algorithm code does not satisfy both a kth additional condition (k is a positive integer that satisfies the equation of k=n−1)(i.e., an additional condition received in the previous step) and an nth additional condition (an additional condition received in the current step), the additional condition provider 130 may determine that an input/output association rule is violated.

That is, the input/output association rule means that input passed in the previous step also passes in the current step, and the situation in which an algorithm completely different from the previous one is written and passed to solve an additional condition may be prevented and association may be maintained.

That is, the input/output association rule is a rule for constructing problems and inputs so that the condition of the previous step is satisfied, that is, the state in which the input/output association is maintained. For input/output association, the minimum number of inputs of the previous step to be included in the current step may be defined as in Equation 1 below.

$$\text{Round}\left(\frac{t_{n-1}}{2}\right) \quad \text{[Equation 1]}$$

Here, n represents the current step, and t represents the number of verification inputs.

The additional condition provider 130 may determine that the algorithm association rule is violated if the (n+1)th algorithm code is not data obtained by modifying the nth algorithm code to satisfy the nth additional condition.

That is, algorithm association means a state in which an algorithm written in the previous step must be modified to solve additional conditions. The algorithm association rule is a rule that forces the previously written algorithm to be modified when constructing additional conditions, and allows an initial problem and additional conditions to be created while maintaining continuity and association.

Algorithm modification is written in the form of extension and modification. Algorithm extension is a method of additionally writing an algorithm related to a written algorithm, and algorithm modification means directly modifying a written algorithm. The PST must satisfy the following rules to maintain the association of an algorithm.

Algorithm association rule 1: Do not change all input types of the previous step with one additional condition.

Algorithm association rule 2: Do not change an output type if one or more input types of the previous step have changed.

Algorithm association rule 3: If an input type is added, do not change the input type of the previous step.

Here, the input type is to pass input data necessary for algorithm execution to an algorithm to verify an algorithm code submitted by a user, and may be determined in advance by a question maker when setting a question.

For example, the input type and the output type may include at least one of an integer, an integer array, a floating point, a floating point array, a two-dimensional array, a character string, and a character string array, without being limited thereto.

That is, in the algorithm association rule 2, the condition "write an algorithm that returns an addition result" is presented. When returning the result of addition as an integer, the output type may change when the input of the previous step has not changed. When more accurate calculation results are desired, the output type may be changed from an integer to a floating point.

In addition, the additional condition provider 130 may select an additional condition based on the algorithm association rules and provide the selected additional condition to a user terminal.

That is, the additional condition provider 130 may select an additional condition that does not violate the algorithm association rules from among a plurality of candidate conditions prepared in advance and provide the selected additional condition to a user terminal.

Hereinafter, a method of selecting additional conditions that do not violate the algorithm association rules is exemplified.

In the above example, as shown in Table 1 below, an initial condition of "algorithm for calculating the sum of two input integers (input type: integer, integer/output type: integer)" may be presented.

TABLE 1

| int sum (int x, int y) |
| { |
| return x+y; |
| } |

Regarding the initial condition described above, in the case of a candidate condition of "Algorithm for calculating the square of an input integer (input type: integer/output type: floating point)" as shown in Table 2 below, the input type is changed by excluding the input y from the initial condition, and the output type is also changed, which violates an algorithm association rule 2, so the candidate condition may not be selected as an additional condition.

TABLE 2

| double sum (int x) |
| { |
| return x * x; |
| } |

Regarding the initial condition described above, a candidate condition of "Return the result of dividing the sum of two input integers by 2 (input type: integer, integer/output type: integer)" as shown in Table 3 below does not violate the algorithm association rule 2, so the candidate condition may be selected as an additional condition.

TABLE 3

```
double sum (int x, int y)
{
    return (x + x) / 2;
}
```

Regarding the initial condition described above, in the case of a candidate condition of "Return the number of values higher than z among all values of integer x and integer array y and calculated results (input type: integer, integer array, integer/output type: integer)" as shown in Table 4 below, input type z is added, but the main y term of the previous addition algorithm is changed to an array, which violates an algorithm association rule 3, so the candidate condition may not be selected as an additional condition.

TABLE 4

```
int sum (int x, int[ ] y, int z)
{
    return ...
}
```

Regarding the initial condition described above, in the case of a candidate condition of "If the sum of two input integers is greater than a z value, return z, if the sum is less than the z value, return the sum (input type: integer, integer, integer/output type: integer)" as shown in Table 5 below, since input type z is added, the input type of the previous step is not changed, and an algorithm association rule 3 is not violated, the candidate condition may be selected as an additional condition.

TABLE 5

```
int sum (int x, int y, int z)
{
    return (x + y) > z ? z : (x + y);
}
```

Hereinafter, test problems related to web browser commands are exemplified.

In the above examples, user commands such as go back/go forward/open new tabs/change tabs/close tabs in a web browser are configured as additional conditions. In a first problem, when a web browser command is implemented and a given input is performed, a condition (hereinafter referred to as condition 1) to return a page being viewed may be presented. At this time, in the first problem, three commands such as PUSH (web page access), BACK (go back), and NEXT (go forward) may be given.

At this time, input and output for condition 1 may be derived as shown in Tables 6 and 7, respectively.

TABLE 6

```
["PUSH", "www.naver.com"],
["PUSH", "www.google.com"],
["PUSH", "www.daum.com"],
["PUSH", "www.midasit.com"],
["BACK", 1]
["PUSH", "www.kakao.com"],
["BACK", 1]
["NEXT", 1]
["PUSH", "www.jainwon.com"],
["PUSH", "www.interpark.com"],
["BACK", 1],
["BACK", 1]
```

TABLE 7

```
"www.kakao.com"
```

In condition 1, it may be assumed that there are 10 test cases (the same format as the input example above) for the purpose of verifying "PUSH", "BACK", and "NEXT" operations. In the second step, an additional condition (hereinafter referred to as condition 2) may execute all of the commands in condition 1, sort visited records in chronological order, and return results after removing duplicates. The resulting output may be derived as shown in Table 8 below.

TABLE 8

```
"www.naver.com",
"www.google.com",
"www.midasit.com",
"www.daum.com",
"www.interpark.com"
"www.pornhub.com",
"www.kakao.com"
```

The test cases of condition 2 may include the test cases of condition 1 to hold the input/output association rule. In addition, in the case of condition 1, since there are 10 test cases and more than 5 test cases may be maintained, the final number of test cases may be determined by modifying the output of the 5 test cases of condition 1 and summing the modified output and additional test cases for condition 2.

At this time, since the test case maintains 5 test case inputs and the input of the previous step is not changed, the coding test device 100 may change output. Since the input of the previous step is not added, it may be determined that all algorithm association rules 1 to 3 are satisfied.

Hereinafter, test problems related to web browser commands are exemplified.

In the above example, an algorithm for inputting two integers and outputting the sum of the two integers is shown in Table 9 below, and an algorithm for dividing the sum of two integers by the third factor, c, is shown in Table 10 below.

In addition, conditions 1 to 3 may be exemplified as in Table 11 below, and input and output may be exemplified as in Table 12 below.

TABLE 9

```
A (int a, int b)
{
Return A + b;
}
```

TABLE 10

```
A (int a, int b, int c) -> Input type cannot be modified by applicants.
{
Return (A + b) / c;
}
```

TABLE 11

Condition 1
A (integer, integer) - rule 1 pass
Integer "f+w" <- tester
Condition 2
A (real number, integer) - rule 2 pass
Integer "f+w" <- tester
Condition 3
A (real number, integer, character string) - rule 3 pass
Integer "f+w" <- tester

TABLE 12

| [Input] | [Output] |
| --- | --- |
| [2, 3] | [5] |
| [3, 4] | [7] |
| [2, 3] | [5] |
| [2, 3] | [5] |
| [2, 3] | [5] |

At this time, the coding test device 100 may automatically verify the above-described algorithm code to determine whether a passing condition is satisfied.

In the case of 'algorithm association rule 1', it is possible to make a decision based on the type of the previous input parameter. Specifically, in the case of the example, it was input in the type of [character string, character string]. When command division is changed to an integer type, it may be determined that one input has been changed in the coding test device 100, and the same may be determined in the case of output.

In addition, when an evaluation score for any one code of first algorithm code and (n+1)th algorithm code is less than a preset threshold score or a coding time of the any one code exceeds a preset threshold time, the additional condition provider 130 may determine that a passing condition is not satisfied.

For example, the additional condition provider 130 may calculate evaluation scores for each algorithm code by applying the first algorithm code and the (n+1)th algorithm code to a preset evaluation algorithm.

In addition, the additional condition provider 130 may receive evaluation scores for each of the first algorithm code and the (n+1)th algorithm code from an administrator terminal.

Specifically, the preset evaluation algorithm may be an algorithm for evaluating user's algorithm code based on a pre-stored correct answer code, or may be an algorithm for evaluating user's algorithm code by verifying output values for a plurality of pre-set input values (i.e., correct answer verification) for verification of a user's algorithm code.

In addition, the preset evaluation algorithm may be an algorithm that performs evaluation by considering whether an additional condition is satisfied for user's algorithm code, coding time, CPU usage, and memory usage.

For example, when an evaluation score for an initial condition is '18', an evaluation score for a first additional condition is '16', an evaluation score for a second additional condition is '10', an evaluation score for a 4th additional condition is '7', and a critical score is '10', the additional condition provider 130 may determine that a user has passed a third additional condition.

In addition, the critical time may be assigned differently by an administrator for the initial condition and each additional condition.

When it is determined that any one code of first algorithm code and (n+1)th algorithm code does not satisfy a passing condition, the test result provider 140 may provide test result information about the any one code to an administrator terminal.

For example, the test result provider 140 may provide test result information about a user to an administrator terminal in the form of a report.

According to one aspect, when it is determined that (n+1)th algorithm code does not satisfy a passing condition, the test result provider 140 may calculate, as test result information, cumulative scores based on evaluation scores for each of first algorithm code to nth algorithm code.

Specifically, the cumulative score may be calculated through Equation 2 below. Here, a weight may vary according to manager's intention and the difficulty level of an additional condition, and the sum of all weights may be set to '1'.

$$\text{score}_n = \sum_{i=1}^{n} r_i \times t_i \quad \text{[Equation 2]}$$

Here, n represents a completed stage, r represents the proportion (weight) of the score for each stage, and t represents the score for each stage.

For example, in Equation 2, the weight and score of an initial condition (n=1) and a first additional condition (n=2) may be set as r=0.1 and t=20, the weight and score of a second additional condition (n=3) may be set as r=0.2 and t=20, and the weight and score of a third additional condition (n=4) and a fourth additional condition (n=5) may be set as r=0.3 and t=20.

In addition, assuming that a user has passed up to a second additional condition, an evaluation score according to an initial condition is '18', an evaluation score according to a first additional condition is '16', and an evaluation score according to the second additional condition is '10', the test result provider 140 may calculate a cumulative score of 5.4 through the operation of '1.8+1.6+2' based on Equation 2, and may calculate a cumulative score of 27 when the score of a problem in a test is 100.

According to one aspect, when it is determined that (n+1)th algorithm code does not satisfy a passing condition, the test result provider 140 may calculate test result information including at least one information of first algorithm code to nth algorithm code and evaluation scores, coding time, CPU usage, and memory usage corresponding to each of the first algorithm code to the nth algorithm code.

FIG. 2 is a block diagram illustrating an example of a test problem based on an association rule according to one embodiment.

Referring to FIG. 2, the coding test device according to one embodiment may provide a PST association problem as shown at reference numeral 200 to a user terminal as a test problem.

Specifically, the coding test device may present a condition (i.e., initial condition) for determining whether the point given in first step 210 is inside or outside the figure.

At this time, the coding test device may determine the result of algorithm code written by a user (applicant) while first inputting an internal point and figure coordinates and secondly inputting an external point and figure information coordinates.

When the user passes first step 210, the coding test device may present an additional condition that determines that the point on the line segment is inside through second step 220.

At this time, the user may not pass second step 220 with only the algorithm code for determining whether the point is on the line segment, and must also pass the input of first step 210 along with the input of second step 220.

That is, while satisfying the condition for the internal lies algorithm (i.e., algorithm code corresponding to the initial condition) to perform normally, the algorithm (i.e., algorithm code corresponding to the additional condition) for determining the point on the line segment also needs to perform normally. In this way, constructing a problem and input so that the condition of the previous step is satisfied indicates the state in which the input/output association is maintained.

Hereinafter, another example of a PST association problem will be described.

The coding test device may provide a user terminal with an initial condition (condition-1) described below, and may sequentially provide the corresponding additional conditions (condition-2 to condition-5) to the user terminal whenever a user satisfies a passing condition.

Initial Condition (Condition-1)

A zombie virus has spread in the area where Yeongsu lives. The martial law command set a zombie virus boundary region based on the location of currently discovered zombies. When newly discovered zombies are within the boundary region, the current boundary region is sufficient, but when zombies are outside the boundary region, the boundary region must be modified quickly. To modify the boundary region, it is necessary to determine whether the location of the newly discovered zombie is inside or outside the boundary region.

The zombie's location is expressed as a 2-dimensional integer coordinate (x,y) (−10,000≤x, y≤10,000). The boundary region is a rectangle composed of 4 coordinates, and is expressed by connecting the coordinates in order from the first coordinate.

A case in which the location of a zombie is input and the zombie is not within the boundary region is described.

1 is output when the zombie is located inside the boundary region, and 0 is output when the zombie is located outside the boundary region.

At this time, an example of input/output corresponding to condition-1 is shown in Table 13 below, a base code provided to a user is shown in Table 14 below, an answer code is shown in Table 15 below, and a case for correct answer verification for user's algorithm code is shown in Table 16 below.

TABLE 13

| Input 1 boundary region | Input 2 zombie location | Expected value |
|---|---|---|
| [[1, 1], [1, 4], [4, 4], [4, 1]] | [2, 2] | 1 |

TABLE 14

```
int main(vector<vector<int>> region, vector<int> position)
{
return 0;
}
```

TABLE 15

```
class CPolygon2d
{
//internal lies algorithm
bool isPointInPolygon(const CPoint2d& crPoint)
{
//algorithm writer for determining if a point is inside a polygon
}
};
int main(vector<vector<int>> region, vector<int> position)
{
//convert an input region to a polygon object
CPolygon2d polygon(region);
//convert an input zombie location to a point object
CPoint2d point(position);
//after performing a function that determines whether an input point is
inside the polygon, return 1 if it is inside
if (polygon.isPointInPolygon(point))
return 1;
else
return 0;
}
```

TABLE 16

| Input 1 boundary region | Input 2 zombie location | Expected value |
|---|---|---|
| [[2, 2], [2, 4], [4, 4], [4, 2]] | [3, 3] | 1 |
| [[2, 1], [2, 4], [8, 4], [8, 1]] | [5, 3] | 1 |
| [[2, 2], [2, 4], [4, 4], [4, 2]] | [8, 8] | 0 |
| [[2, 1], [2, 4], [8, 4], [8, 1]] | [9, 1] | 0 |

Additional Condition (Condition-2)

"When a zombie exists on the line segment of a boundary region, judge it as inside and output 1."

At this time, an example of input/output corresponding to condition-2 is shown in Table 17 below, a base code provided to a user is shown in Table 18 below, an answer code is shown in Table 19 below, and cases for correct answer verification for user's algorithm code are shown in Table 20 below. Here, the shaded portions shown in Tables 19 and 20 mean added or modified portions.

TABLE 17

| Input 1 boundary region | Input 2 zombie location | Expected value |
|---|---|---|
| [[1, 1], [1, 4], [4, 4], [4, 1]] | [4, 2] | 1 |

TABLE 18

```
int main(vector<vector<int>> region, vector<int> position)
{
return 0;
}
```

TABLE 19

```
class CPolygon2d
{
//internal lies algorithm
bool isPointInPolygon(const CPoint2d& crPoint, bool bInOnLine)
{
//enter an option to determine whether a line position is internal
//determine in advance whether a point is on the line, and return
TRUE
immediately if the point is on the line
if (!bInOnLine
? CMath :: isPointInRegionOnLine(crPoint, region)
```

TABLE 19-continued

```
: CMath :: isPointInRegion(crPoint, region)
return true;
//algorithm writer for determining if the point is inside the polygon
}
};
int main(vector<vector<int>> region, vector<int> position)
{
//convert an input region to a polygon object
CPolygon2d polygon(region);
//convert an input zombie location to a point object
CPoint2d point(position);
//after performing a function that determines whether an input
point is inside the polygon, return 1 if it is inside
if (polygon.isPointInPolygon(point, true)
return 1;
else
return 0;
}
```

TABLE 20

| Input 1 boundary region | Input 2 zombie location | Expected value |
|---|---|---|
| [[2, 2], [2, 4], [4, 4], [4, 2]] | [3, 3] | 1 |
| [[2, 1], [2, 4], [8, 4], [8, 1]] | [5, 3] | 1 |
| [[2, 2], [2, 4], [4, 4], [4, 2]] | [8, 8] | 0 |
| [[2, 1], [2, 4], [8, 4], [8, 1]] | [9, 1] | 0 |
| [[2, 1], [2, 4], [8, 4], [8, 1]] | [8, 3] | 1 |
| [[2, 2], [2, 4], [4, 4], [4, 2]] | [4, 3] | 1 |

Additional Condition (Condition-3)

"When the zombie's location is outside, return the line segment number of the nearest boundary region. The number of line segments of the boundary region is the same as the input coordinates. Outputs 1 when it is internal like the previous condition."

At this time, an example of input/output corresponding to condition-3 is shown in Table 21 below, a base code provided to a user is shown in Table 22 below, an answer code is shown in Table 23 below, and cases for correct answer verification for user's algorithm code are shown in Table 24 below. Here, the shaded portions shown in Tables 23 and 24 mean added or modified portions.

TABLE 21

| Input 1 boundary region | Input 2 zombie location | Expected value |
|---|---|---|
| [[1, 1], [1, 4], [4, 4], [4, 1]] | [5, 2] | 1 |

TABLE 22

```
int main(vector<vector<int>> region, vector<int> position)
{
return 0;
}
```

TABLE 23

```
class CPolygon2d
{
bool isPointInPolygon(const CPoint2d& crPoint, bool bInOnLine)
{
//internal lies algorithm
}
```

TABLE 23-continued

```
int getNearestPointIndex(CPoint2d pt)
{
// return the numbers of nearest line segments
}
}:
int main(vector<vector<int>> region, vector<int> position)
{
//convert an input region to a polygon object
CPolygon2d polygon(region);
//convert an input zombie location to a point object
CPoint2d point(position);
//after performing a function that determines whether an input point
is inside the polygon, return 1 if it is inside
if (polygon.isPointInPolygon(point))
return 1;
else //if outside, return the number of the nearest line segment
return polygon.getNearestPointIndex(point);
}
```

TABLE 24

| Input 1 boundary region | Input 2 zombie location | Expected value |
|---|---|---|
| [[2, 2], [2, 4], [4, 4], [4, 2]] | [3, 3] | 1 |
| [[2, 1], [2, 4], [8, 4], [8, 1]] | [5, 3] | 1 |
| [[2, 2], [2, 4], [4, 4], [4, 2]] | [8, 3] | 2 |
| [[2, 1], [2, 4], [8, 4], [8, 1]] | [5, 0] | 3 |
| [[2, 1], [2, 4], [8, 4], [8, 1]] | [8, 3] | 1 |
| [[2, 2], [2, 4], [4, 4], [4, 2]] | [4, 3] | 1 |

Additional Condition (Condition-4)

"The boundary region, which was input as a rectangle in the previous condition, is input as a polygon composed of [3-N] coordinates. It is expressed by connecting in order from the coordinates of the first order entered. Write an algorithm that satisfies conditions 1 to 3 for a polygonal boundary region."

At this time, an example of input/output corresponding to condition-4 is shown in Table 25 below, a base code provided to a user is shown in Table 26 below, an answer code is shown in Table 27 below, and cases for correct answer verification for user's algorithm code are shown in Table 28 below. Here, the shaded portions shown in Tables 27 and 28 mean added or modified portions.

TABLE 25

| Input 1 boundary region | Input 2 zombie location | Expected value |
|---|---|---|
| [[2, 6], [7, 7], [8, 4], [5, 2], [2, 4]] | [5, 5] | 1 |

TABLE 26

```
int main(vector<vector<int>> region, vector<int> position)
{
return 0;
}
```

TABLE 27

```
class CPolygon2d
{
bool isPointInPolygon(const CPoint2d& crPoint, bool bInOnLine)
{
//internal lies algorithm (rectangle -> change logic to polygon)
}
```

TABLE 27-continued

```
int getNearestPointIndex(CPoint2d pt)
{
//return the numbers of nearest line segments
}
};
int main(vector<vector<int>> region, vector<int> position)
{
//convert an input region to a polygon object
CPolygon2d polygon(region);
//convert an input zombie location to a point object
CPoint2d point(position);
//after performing a function that determines whether an input
point is inside the polygon, return 1 if it is inside
if (polygon.isPointInPolygon(point))
return 1;
else //if outside, return the number of the nearest line segment
return polygon.getNearestPointIndex(point);
}
```

TABLE 28

| Input 1 boundary region | Input 2 zombie location | Expected value |
|---|---|---|
| [[2, 2], [2, 4], [4, 4], [4, 2]] | [3, 3] | 1 |
| [[2, 1], [2, 4], [8, 4], [8, 1]] | [5, 3] | 1 |
| [[2, 2], [2, 4], [4, 4], [4, 2]] | [8, 3] | 2 |
| [[2, 4], [6, 7], [10, 3], [10, 1] [4, 2]] | [6, 4] | 1 |
| [[2, 4], [6, 7], [10, 3] [10, 1], [4, 2]] | [10, 2] | 1 |

Additional Condition (Condition-5)

"When the zombie's location is outside, return the minimum boundary region including the zombie's location. Conditions for determining whether the location of zombies is inside or outside are the same as those in the previous step. The line segments of a newly created minimum boundary region do not overlap each other and are in the form of a convex hull with no depressions. The created boundary region rotates clockwise. When the input zombie location is internal, the boundary given as input is returned as it is."

At this time, an example of input/output corresponding to condition-5 is shown in Table 29 below, a base code provided to a user is shown in Table 30 below, an answer code is shown in Table 31 below, and cases for correct answer verification for user's algorithm code are shown in Table 32 below. Here, the shaded portions shown in Tables 29 to 32 mean added or modified portions.

TABLE 29

| Input 1 boundary region | Input 2 zombie location | Expected value |
|---|---|---|
| [[3, 5], [6, 7], [9, 5]] | [6, 4] | [[3, 5], [6, 7], [9, 5], [6, 4]] |

TABLE 30

```
vector <vector <int > >       main(vector<vector<int> >  region,
vector <int> position)
{
vector<vector<int> > vertices;
return vertices;
}
```

TABLE 31

```
class CPolygon2d
{
bool isPointInPolygon(const CPoint2d& crPoint, bool bInOnLine)
{
//polygon internal lies algorithm
}
int getNearestPointIndex(CPoint2d pt)
{
//return the numbers of nearest line segments
}
};
int main(vector<vector<int>> region, vector<int> position)
{
//convert an input region to a polygon object
CPolygon2d polygon(region);
//convert an input zombie location to a point object
CPoint2d point(position);
//after performing a function that determines whether an input point is
inside the polygon, return existing boundaries if it is inside
//if outside, return a minimum boundary region including the input point
if (!polygon.isPointIn Polygon(point)
polygon.regenerateConvexHull(point);
return polygon.get Vertices( );
}
```

TABLE 32

| Input 1 boundary region | Input 2 zombie location | Expected value |
|---|---|---|
| [[2, 6], [5, 6], [8, 4], [4, 1]] | [9, 6] | [[2, 6], [5, 6], [9, 6], [8, 4], [4, 1]] |
| [[2, 6], [5, 6], [8, 4], [4, 1]] | [2, 3] | [[2, 6], [5, 6], [8, 4], [4, 1], [2, 3]] |
| [[3, 5], [11, 7], [13, 3], [9, 3]] | [5, 1] | [[3, 5], [11, 7], [13, 3], [5, 1]] |
| [[3, 5], [11, 7], [13, 3], [9, 3]] | [9, 5] | [[3, 5], [11, 7], [13, 3], [9, 3]] |

FIGS. 3A to 3D are graphs showing examples of test result information calculated through a coding test device according to one embodiment.

In FIGS. 3A to 3D, reference numeral 310 exemplifies an evaluation score for each step among test result information, reference numeral 320 exemplifies coding time for each step among test result information, reference numeral 330 exemplifies memory usage for each step among test result information, and reference numeral 340 exemplifies CPU usage for each step among test result information.

Here, step 1 is a step of providing/evaluating an initial condition, and steps 2 to 5 are steps of providing/evaluating first additional condition to fifth additional condition, respectively.

That is, in addition to user's cumulative scores according to steps 1 to 5, the coding test device according to one embodiment may provide test result information including evaluation scores, coding time, CPU usage, and memory usage for each of steps 1 to 5.

Specifically, the coding test device may record and analyze various information of a user based on the continuity and correlation of additional conditions. The user's cumulative score means a cumulative score up to the final step, and algorithm code submitted at each step, CPU and memory usage, submitted time, and score are recorded.

A cumulative score obtained in one problem-solving sequence may create a fair and even distribution of scores, and the cumulative score may be compared with the average of all applicants to identify the relative level of development ability. In addition, CPU, memory, and coding time recorded every time a user submits algorithm code may be used as important indicators to determine the trend of code quality change.

More specifically, according to reference numerals 310 to 340, test result information provided by the coding test device is information collected from the perspective of development ability, and may provide sentences that interpret expected characteristics in convergence with tests that identify developer's ability to provide information to evaluators (i.e., managers) more effectively.

For example, in the graph showing coding time for each step shown in reference numeral 320, although the user's time to solve step 1 is greater than other users' time, the user's time is reduced compared to other users' time through several steps. These results indicate that the user is a type of developer who carefully analyzes problems in practice and considers expansion of functions and risk factors.

That is, by efficiently providing highly reliable test result information for user evaluation, the coding test device allows administrators to review analysis results in detail while checking codes and changes submitted at each step, helps administrators quickly identify users' core development skills, and may assist evaluators to conduct more efficient evaluation while suggesting elements to focus on to the evaluators.

FIGS. 4A to 4C are graphs for explaining a user's score distribution according to a coding test device according to one embodiment.

Referring to FIGS. 4A to 4C, reference numeral 410 exemplifies the score distribution of users who took the highest difficulty problem of the conventional coding test (CT), reference numeral 420 exemplifies the score distribution of users who took the lowest difficulty problem of the CT, and reference numeral 430 exemplifies the score distribution of users who took the coding test (PST) according to one embodiment.

Specifically, the difficulty setting of the initial problem of the PST is the same as the conventional CT, but difficulty prediction is more accurate because it is possible to create a linkage of conditions while composing several steps.

In the case of a single problem in the CT, as shown in reference numerals 410 and 420, as the difficulty level decreases, the percentage of high scorers increases, Also, as the difficulty level increases, the percentage of scoreless applicants increases. As a result, an extreme score distribution is formed. On the other hand, in the case of the PST, since the degree of difficulty is adjusted by adding a condition, a score distribution similar to a normal distribution is obtained.

On the other hand, the PST does not limit the number of additional conditions. That is, since there is no limit to conditions that a user may maximally solve, the problem of setting a difficulty level empirically may be improved.

Also, the CT may present several problems, and may be configured so that the number of problems that may be solved by users varies according to user's ability. However, since the problems are not related, even if applicants have the same score, it may be difficult to accurately determine when the problems solved are different. However, since the PST has continuity in which all applicants start from the same problem and all of them solve the same additional condition in order, as shown in reference numeral 430, a more accurate test is possible.

To determine the validity of the PST verification, the correlation between development ability evaluation conducted on 80 developers and the PST was analyzed, and the results of this correlation analysis are shown in Table 33 below.

TABLE 33

| Development ability | Evaluation score top 30% | Evaluation score middle 30% | Evaluation score bottom 40% |
| --- | --- | --- | --- |
| Code writing ability | 0.115 | 0.082 | 0.044 |
| Code structure design ability | 0.217 | 0.072 | 0.038 |
| Algorithm writing ability | 0.097 | 0.101 | 0.031 |
| Ability to respond to planning requirements | 0.135 | 0.048 | 0.016 |

According to Table 33, the correlation between the development ability evaluation and PST scores of the top 30% group is higher than that of other groups. In particular, a high degree of correlation is observed in code structure design ability. In the case of algorithm writing ability, significant correlation is shown in both the top 30% group and the middle 30% group.

FIG. 5 is a flowchart for explaining a coding test method according to one embodiment.

That is, FIG. 5 is a flowchart for explaining an operation method of the coding test device according to one embodiment described with reference to FIGS. 1 to 4C. In description with reference to FIG. 5, repeated description described with reference to FIGS. 1 to 4C is omitted.

Referring to FIG. 5, according to the coding test method, in step 510, a problem provider may provide a test problem including an initial condition a user terminal.

Next, in step 520, a code receiver may receive first algorithm code corresponding to the initial condition from the user terminal.

Next, in step 530, an additional condition provider may determine whether a predetermined passing condition for the first algorithm code is satisfied.

When it is determined that the passing condition is satisfied based on the result of determination for the first algorithm code in step 530, an additional condition related to the initial condition may be provided to the user terminal in step 540. Thereafter, steps 520 to 540 of the coding test method may be repeated.

In addition, according to the coding test method, when the passing condition is not satisfied in step 530 or when all of a predetermined number of additional passing conditions are provided, step 550 may be performed. In step 550, a test result provider may provide test result information to a preset administrator terminal.

In conclusion, when the present disclosure is used, user's coding ability may be verified with higher accuracy than conventional coding tests through a problem-solving coding test with additional conditions.

In addition, when the present disclosure is used, the accuracy of verification of user's coding ability may be increased by providing a result report reflecting an evaluation cumulative score, an evaluation score for each step, coding time, CPU usage, and memory usage as results of a coding test.

That is, the present disclosure may ensure a fair test process due to the continuity and correlation of the PST additional condition, and may help users analyze various development ability patterns more accurately.

In addition, the present disclosure may confirm user's development ability while reproducing situations in practice through the PST, which has a high correlation with evaluation of incumbent's development ability.

In addition, the present disclosure may be used as a basis for various analyzes because it is possible to determine the expansion result and resource status of a code created while passing through problem stages due to explanation and correlation while viewing a development ability test report planning document.

In addition, the present disclosure has an operational advantage in that problems are not standardized and various problems may be created by combination of conditions. The existing system is a system that may only be solved with one problem, but the present disclosure is characterized in that various conditions may be added, so that practical problems may be realized.

According to one embodiment, the present disclosure can verify user's coding ability with higher accuracy than conventional coding tests through a problem-solving coding test with additional conditions.

According to one embodiment, the present disclosure can increase the accuracy of verification of user's coding ability by providing a result report reflecting an evaluation cumulative score, an evaluation score for each step, coding time, CPU usage, and memory usage as results of a coding test.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

[Description of Symbols]

| | |
|---|---|
| 100: CODING TEST DEVICE | 110: PROBLEM PROVIDER |
| 120: CODE RECEIVER | 130: ADDITIONAL CONDITION PROVIDER |
| 140: TEST RESULT PROVIDER | |

What is claimed is:

1. A coding test device, comprising:
   a problem provider for providing a test problem comprising an initial condition to a user terminal;
   a code receiver for receiving first algorithm code corresponding to the initial condition from the user terminal; and
   an additional condition provider for determining whether a predetermined passing condition for the first algorithm code is satisfied and providing an additional condition related to the initial condition to the user terminal based on the result of determination for the first algorithm code,
   wherein the predetermined passing condition includes a preset association rule, and
   wherein the preset association rule is configured to determine relevance of the algorithm based on at least one of whether a single additional condition changes all input types of a previous stage, whether an output type is changed when at least one input type of the previous stage is changed, and whether the input type of the previous stage is changed when an input type is added.

2. The coding test device according to claim 1, wherein the additional condition provider determines whether a passing condition for (n+1)th algorithm code corresponding to an nth additional condition (n is a positive integer) is satisfied, and provides an (n+1) th additional condition related to the nth additional condition to the user terminal based on the result of determination for the (n+1) th algorithm code.

3. The coding test device according to claim 2, wherein the code receiver receives the (n+1)th algorithm code and (n+2)th algorithm code corresponding to the (n+1)th additional condition from the user terminal.

4. The coding test device according to claim 2, wherein, when it is determined that the (n+1) th algorithm code violates the preset association rule, the additional condition provider determines that the passing condition is not satisfied.

5. The coding test device according to claim 4, wherein, when the (n+1) th algorithm code does not satisfy both a kth additional condition (k is a positive integer that satisfies an equation of k=n−1) and the nth additional condition, the additional condition provider determines that the association rule is violated.

6. The coding test device according to claim 4, wherein, when the (n+1) th algorithm code is not data obtained by modifying the nth algorithm code to satisfy the nth additional condition, the additional condition provider determines that the association rule is violated.

7. The coding test device according to claim 2, wherein, when an evaluation score for any one code of the first algorithm code and the (n+1) th algorithm code is less than a preset threshold score, or a coding time of the any one code exceeds a preset threshold time, the additional condition provider determines that the passing condition is not satisfied.

8. The coding test device according to claim 2, further comprising a test result provider for providing test result information about the any one code to a preset administrator terminal when it is determined that any one code of the first algorithm code and the (n+1) th algorithm code does not satisfy the passing condition.

9. The coding test device according to claim 8, wherein, when it is determined that the (n+1) th algorithm code does not satisfy the passing condition, the test result provider calculates, as the test result information, a cumulative score based on evaluation scores for each of the first algorithm code to the nth algorithm code.

10. The coding test device according to claim 8, wherein, when it is determined that the (n+1) th algorithm code does not satisfy the passing condition, the test result provider calculates the test result information comprising at least one information of the first algorithm code to the nth algorithm code and evaluation scores, coding time, CPU usage, and memory usage corresponding to each of the first algorithm code to the nth algorithm code.

11. A coding test method, comprising:
    providing, by a problem provider, a test problem comprising an initial condition to a user terminal;
    receiving, by a code receiver, first algorithm code corresponding to the initial condition from the user terminal; and
    determining, by an additional condition provider, whether a predetermined passing condition for the first algorithm code is satisfied and providing an additional condition related to the initial condition to the user terminal based on the result of determination for the first algorithm code, wherein the predetermined passing condition includes a preset association rule, and wherein the preset association rule is configured to determine relevance of the algorithm based on at least one of whether a single additional condition changes all input types of a previous stage, whether an output type is changed when at least one input type of the previous stage is changed, and whether the input type of the previous stage is changed when an input type is added.

* * * * *